United States Patent [19]

Novello et al.

[11] 4,193,723
[45] Mar. 18, 1980

[54] TEMPLATE CUTTING DEVICE

[75] Inventors: Renzo Novello, Manzano; Elvio Bottussi, Medeuzza, both of Italy

[73] Assignee: Fratelli Novello S.p.A., Manzano, Italy

[21] Appl. No.: 833,681

[22] Filed: Sep. 15, 1977

[30] Foreign Application Priority Data

Sep. 22, 1976 [IT] Italy .............................. 83444 A/76

[51] Int. Cl.² .............................................. B23C 1/18
[52] U.S. Cl. .................................. 409/122; 33/23 H; 144/144 R
[58] Field of Search ............... 144/144 R, 137, 145 R, 144/145 A, 145 C, 154, 323; 33/18 B, 27 K, 23 H; 83/565; 90/13.9

[56] References Cited

U.S. PATENT DOCUMENTS

| 3,426,645 | 2/1969 | Williams | 90/13.9 |
|---|---|---|---|
| 3,516,463 | 6/1970 | Betzler | 144/144 R |
| 3,601,005 | 8/1971 | McKusick | 90/13.9 |
| 3,838,623 | 10/1974 | Schell | 144/145 R |
| 3,865,162 | 2/1975 | Schmidt | 144/144 R |
| 3,878,761 | 4/1975 | Makowski | 90/13.9 |

Primary Examiner—Robert L. Spruill
Assistant Examiner—W. D. Bray
Attorney, Agent, or Firm—Blanchard, Flynn, Thiel, Boutell & Tanis

[57] ABSTRACT

A template cutting device suitable for transferring onto a rotatable plain unworked template the lateral profile of a shaped sample piece that passes substantially perpendicularly to the device, which is specially suitable for use in machines which make shaped pieces in general and in which the profile is reproduced on a control cam or template. The purpose of the device is to manufacture control cams or templates and the like. The device includes structure for sensing the profile of the shaped piece when the former is moving crosswise to the latter; and a working group suitable for processing the plain, unworked template so as to obtain the control cam or template, whereby the forward movement of the sample piece controls the rotation of said unworked template.

7 Claims, 4 Drawing Figures

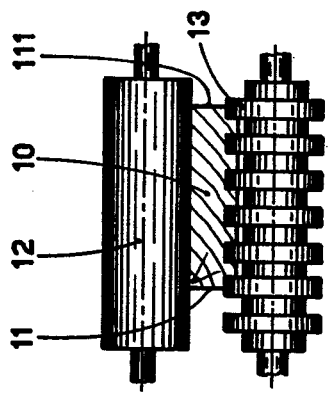
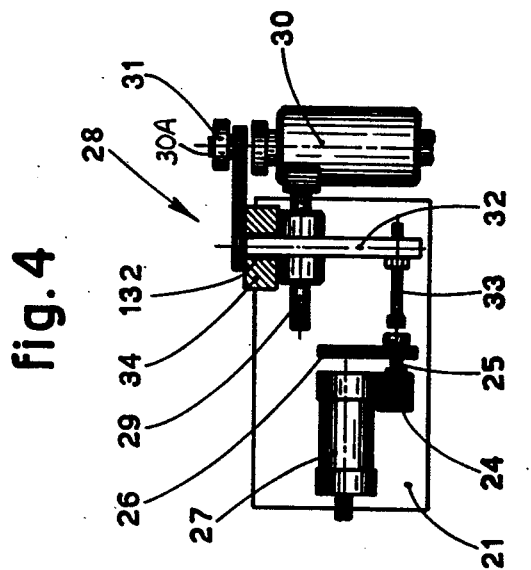
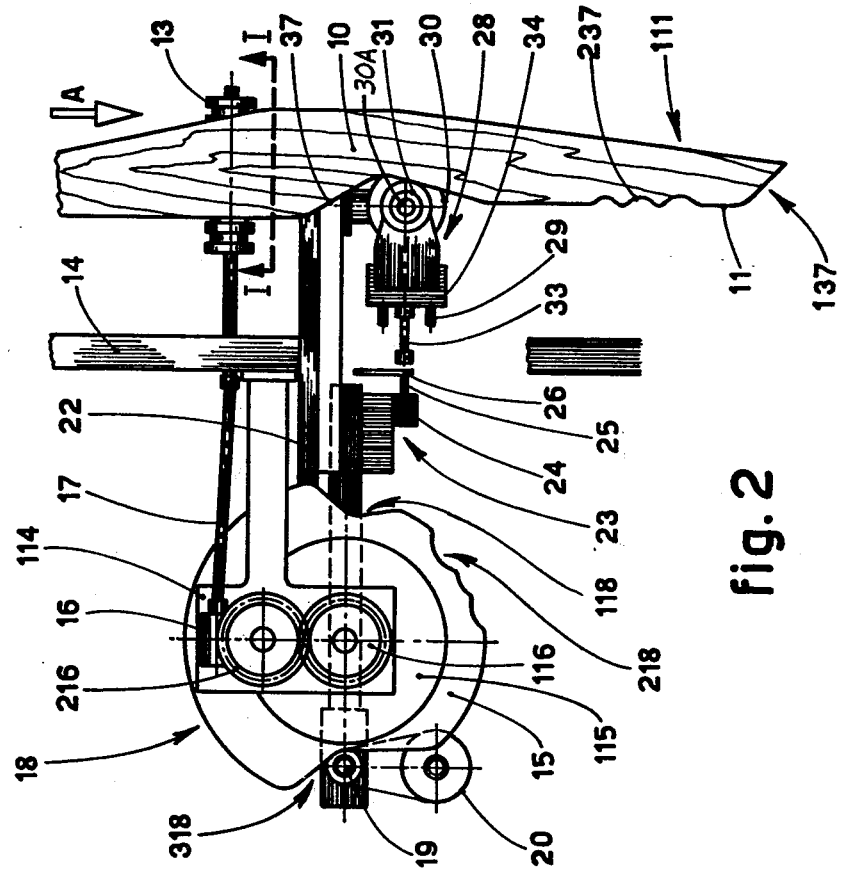

TEMPLATE CUTTING DEVICE

FIELD OF THE INVENTION

This invention relates to a template cutting device suitable for transferring onto a rotating element the lateral profile of a shaped sample piece that passes substantially perpendicularly to said device.

BACKGROUND OF THE INVENTION

To be precise, this invention concerns a device suitable for making control templates or cams which memorize the lateral profile of a shaped piece and which are employed in devices reproducing and sensing the finished profile in machines used to produce shaped pieces in general. One type of machine is the subject of our copending U.S. application Ser. No. 867,598, filed Jan. 6, 1978.

As shown in the aforesaid U.S. patent application, the machine to produce shaped pieces comprises in reciprocal combination and coordination a bench for entraining, guiding and processing, crosswise to which there runs at least one tool controlled by devices reproducing the profile; at the entrance of said bench there is a loader device and planing-grooving means, and at the exit thereof there are planing means.

The reproducing devices preferentially employed in the aforesaid machine can make use of the templates of a closed shape, the outline of which corresponds functionally to the profile of the shaped sample piece to be reproduced.

Therefore, a purpose of this invention is to provide a device suitable for reproducing simply and easily on said templates having a closed shape or on a rotating element the profile of the shaped sample piece with its conformation as obtained along one profile.

A further purpose is to attain a device that can be easily mounted on the machine which is the subject of the aforesaid U.S. patent application.

Yet another purpose is to obtain a template which is completely finished and ready for use and is, therefore, suitable for controlling the reciprocal positions of the tool moving crosswise to the bench and of the piece to be worked in a manner coordinated with the forward movement of the piece to be worked.

Besides the above purposes, the invention which is our subject offers various advantages such as: employment of the same components present in the production machine; rapid setting-up of the device on the machine; reliability of the profile obtained on the template; and ability to make perfect reproductions of the profile reproduced. These purposes and advantages together with other purposes and advantages which will appear in the description given hereinafter are pursued by this invention by means of a device suitable for transferring onto a rotating element the lateral profile of a shaped piece which passes substantially perpendicularly to said device. The device is especially suitable for use in machines which produce shaped pieces in general and in which the profile is reproduced on a control cam or template. The purpose of the device is to obtain said control cams or templates, and the device is characterized by comprising in mutual combination and coordination a means to sense the lateral profile of the shaped piece moving crosswise to said means; and a working group suitable for processing a plain, unworked disk and controlled by a group to amplify movement, wherein the forward movement of the sample piece controls the rotation of said rotating element.

BRIEF DESCRIPTION OF THE DRAWINGS

We offer hereinbelow as a nonlimiting example the description of a preferential form of the invention and make references to the accompanying drawings, wherein:

FIG. 2 is a top plan view of the embodiment illustrated in FIG. 1;

FIG. 3 is a sectional view taken along the line III—III of FIG. 2; and

FIG. 4 is a partially cut-away front view of the measuring-feeling structure.

DETAILED DESCRIPTION

Figure 1:
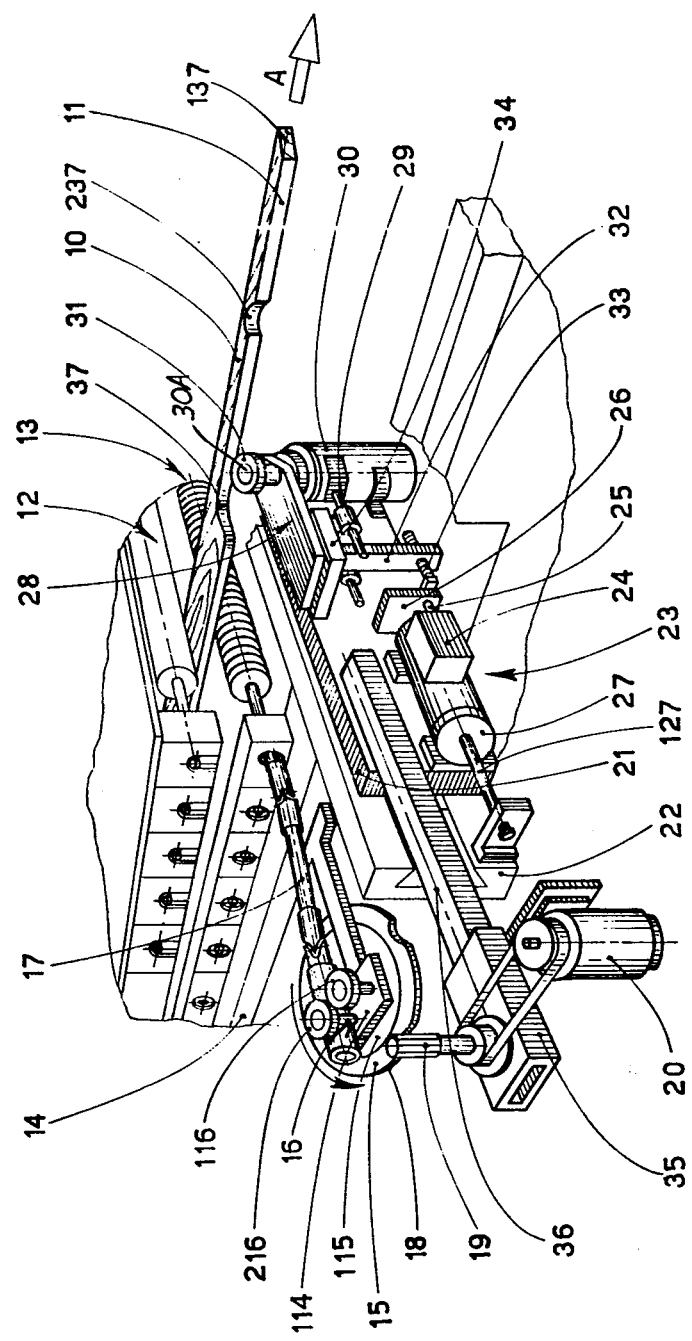
FIG. 1 is a partial perspective view of a preferred embodiment of the invention and also shows a portion of the machine.

In the drawings, the same parts or parts performing the same functions have been given the same reference numbers.

With reference to FIG. 1 and the following figures, we have as follows:

A shaped sample piece is referred to generally by the reference numeral 10, wherein one edge 11 thereof is the lateral profile which has the irregularities 37, 137 and 237 desired and which are to be copied onto a reproducing template member. A profile 111 (FIG. 2) exists on the other side of the shaped sample piece 10. Upper and lower rotatably driven roller groups 12 and 13, respectively, are mounted on a frame 14 and provide the drive for moving the sample piece 10 in the direction A. The lower roller group 13 consists of grooved rollers (see FIG. 3) which cooperate with grooves running lengthwise in the sample piece 10 and force it to move straight forwards along the axis of the machine.

The partially shown frame 14 of the machine is the subject of our aforesaid patent application Ser. No. 867,598, filed Jan. 6, 1978. A support 114 is mounted on the frame 14 and sustains the means that control and guide a template member 15. The template member or control cam is made of a suitable material and is cut from a plain, unworked circular disk and is supported on a plate 115.

A reduction gear is provided for rotatably driving the plate 115. The reduction gear 16 is connected to and rotatably driven by means of a universal jointed shaft 17 connected to the lower roller group 13. The reduction gear 16 effects a driving of a meshed gear pair 116, 216. The axle of the gear 116 is rigidly connected to the template member 15. The ratio existing between the gear 116 and the gear 216, which receives its motion from the drive to the reduction gear 16, determines the ratio between the length of the piece 10 and the outer circumference of the template member 15. The universal jointed shaft 17, which is driven from a roller in the roller group 13 transmits the rotary drive to the reduction gear 16.

The shaped peripheral edge 18 of the template member 15 is shaped by means of a tool 19 having a vertical axle so as to conform with the profile 11 of the piece 10. The position or profile 118 on the template member 15 corresponds to the position or profile 237 on the sample piece 10. The position on the template member 218 corresponds to the position 137 on the template member 15 and the position 318 on the template member 15 corresponds to the position 37. The axis of the tool 19 is oriented at a right angle to the plane of the template member 15. The tool 19 consists of a cutter and is rotatably driven by a drive motor 20 and appropriate drive belting connected therebetween. The vertical axes of the tool 19, gear wheel 116 and a free-wheeling contour follower 31 lie substantially on the same vertical plane.

A mobile sliding member 21 is movably supported on an immovable guide member 22 connected to the frame 14. A support arm 36 is mounted on the sliding member 21 and has a carriage 35 secured to the free end thereof. The tool 19 and drive motor 20 are mounted on the carriage 35.

A force amplifier grouping 23 is provided for the tool 19 and is of a known type, here consisting of a piston-type distributor 24 controlled by a stem 25, which has on its end a plate 26. The piston-type distributor 24 distributes the feed force to the chambers of power cylinder 27. The housing of the power cylinder 27 is connected to the mobile sliding member 21, while the free end of the piston rod 127 is fixed to the immovable guide 22.

A profile sensing device 28 is composed of a support block 34 which is movably guided on guides 29 crosswise or perpendicular to the direction A of forward movement of the sample piece 10 and parallel to the action of the tool 19 on the template member 15. The guides 29 are connected to a shaft supporting structure 30. The shaft 30A supported on the support block 34 (FIG. 4) and the wheel 31 is free wheelingly mounted thereon to serve for the making of template members. The shaft supporting structure 30 is fixed to the mobile sliding member 21. The free-turning contour following wheel 31 on the free-wheeling shaft 30 defines the sensing device 28 and rolls along the profile 11 of the piece 10. A prong extends downwardly from the sensing device 28 and operatively cooperates with the distributor 24 of the force amplifier device 23 through a position regulator 33. The support block 34 has mounted thereon in a removable manner the sensing device 28, the prong 32 thereof being inserted into a hole 132 in the support block 34.

OPERATION

The operation will now be described for convenience.

First, the working tools of the machine to make shaped pieces are removed from the shaft 30, and the tool protection means, which we have not shown here, are taken from the support block 34. Next the sensing device 28 is mounted on said support block 34 and the prong 32 thereof is inserted into the hole 132 (FIG. 4) in the support block 34. Then the support block 34 is positioned on the guides 29 in such a way that the vertical axis of the free-wheeling wheel 31 of the sensing device 28 coincides with the vertical axis of the shaft supporting structure 30.

A plain, unworked disk, from which the reproducing template member 15 is to be cut, is then mounted on the flange 115 and the carriage means 35 of the working group 19–20 is then connected to the support 36.

Next the tool 19 is radially adjusted to the unworked disk 215 from which the template member 15 is to be cut, and the mobile sliding member 21 is positioned in respect of the immovable guide member 22 in such a way as to ensure that the tool 19 is always in close contact with the presumable peripheral edge 18 of the template member 15. The tool 19 must be in close contact when the profile 11 of the shaped piece 10 projects out to its maximum extent or withdraws to its innermost extent.

Lastly the threaded regulator 33 of the sensing device 28 is positioned in such a way that said threaded regulator 33 is always in close contact with the distributor 24 of the force amplifier means 23 through the plate 26 and the stem 25.

The machine is then activated and the shaped sample piece 10 is introduced between the roller groups 12 and 13 with its profile 11 facing towards the sensing device 28.

The sample piece 10 passes before the sensing device 28 and touches it in such a way that the free-wheeling wheel 31 runs on the profile 11 and pushes back the support block 34, which moves on the guides 29 and acts with the screw 33 on the stem 25 of the distributor 24. As a result the cylinder 27 displaces the sliding member 21 outwards until the thrust coming from the piece 10 is balanced on the stem 25 of the distributor 24. The tool 19, being moved by the motor 20, thus begins to work the template member 15 along its edge 18.

If the profile 11 contains a projection 37, the latter produces on the distributor 24 a thrust which determines an outward displacement of the sliding member 21 and thus of the tool 19 in respect of the axis of rotation of the template member 15.

Contrary thereto, a recess 137 in the profile 11 produces a slackening of the thrust on the distributor 24, whereby there is an inward displacement of the mobile sliding means 21 and therefore the tool 19 is brought close to the axis of rotation of the template member 15. In this way the linear profile 11 of the shaped piece 10 is reproduced on the edge 18 of the template member 15, and the member template is thus made to correspond to said sample piece 10.

We have described here a preferential realization of the invention, but variants can be applied by those having ordinary skill in this field without departing from the scope of the invention.

Thus it is possible to change the shape and size of some or all the parts and also to use a pneumatic amplifier. It is possible to mount the tool group 19 and motor 20 preferably on the same axis and in such a way that they can withdraw into a recess. These and other variants are possible for an expert in this field without departing thereby from the scope of the invention.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A template cutting device for transferring onto a template the lateral profile of an elongated shaped sample piece, comprising:
    frame means;
    a sensing device on said frame means including a support member supported for movement toward and away from said lateral profile on said sample piece;
    drive means on said frame means directly operatively drivingly engaging said sample piece to effect a movement of said sample piece relative to said frame means and substantially perpendicularly to the path of movement of said sensing device, said sensing device including a contour following member mounted on said support member and engaging said lateral profile of said sample piece;

support means supporting said template for rotatable movement about a fixedly located axis in correspondence to the movement of said sample piece; and cutting tool means mounted on said support member and movable therewith in cutting relationship with a lateral edge of said template, whereby the movement of said sample piece controls the movement of said cutting tool means.

2. The template cutting device according to claim 1, wherein said sensing device and said cutting tool means controlled thereby move in a parallel manner with said support member.

3. The template cutting device according to claim 1, wherein said support member and said cutting tool means mounted thereon move along a radius of said template.

4. A template cutting device for transferring onto a template the lateral profile of an elongated shaped sample piece, comprising:

frame means;

a sensing device on said frame means including a support member supported for movement toward and away from said lateral profile on said sample piece, said sensing device including on one side thereof a free-wheeling wheel which is movable relative to said support member and engages the lateral profile of said shaped sample piece and on the other side thereof a force amplifier means, and including adjustment means for adjusting the relative positions of said sensing device and said force amplifier means;

drive means on said frame means operatively drivingly engaging said sample piece to effect a movement of said sample piece relative to said frame means and substantially perpendicularly to the path of movement of said sensing device, said sensing device including a contour following member mounted on said support member and engaging said lateral profile of said sample piece;

support means supporting said template for rotatable movement about a fixedly located axis in correspondence to the movement of said sample piece; and cutting tool means mounted on said support member and movable therewith in cutting relationship with a lateral edge of said template, whereby the movement of said sample piece controls the movement of said cutting tool means.

5. The template cutting device according to claim 4, wherein said support member has guides thereon, said free-wheeling wheel being movably supported on said guides and relative to said force amplifier means.

6. The template cutting device according to claim 5, wherein said free wheeling wheel is mounted on a plate, said plate beng movably mounted on said guides, said force amplifier means being operatively connected to said plate whereby movement of said plate will activate said force amplifier means to move in said cutting tool means relative to said template.

7. A template cutting device for transferring onto a template the lateral profile of an elongated shaped sample piece, comprising:

frame means;

a sensing device on said frame means including a support member supported for movement toward and away from said lateral profile on said sample piece;

drive means on said frame means operatively drivingly engaging said sample piece to effect a movement of said sample piece relative to said frame means and substantially perpendicularly to the path of movement of said sensing device, said sensing device including a contour following member mounted on said support member and engaging said lateral profile of said sample piece;

support means supporting said template for rotatable movement about a fixedly located axis in correspondence to the movement of said sample piece, said drive means drivingly engaging said template to effect a rotary movement thereof; and cutting tool means mounted on said support member and movable therewith in cutting relationship with a lateral edge of said template, whereby the movement of said sample piece controls the movement of said cutting tool means.

* * * * *